United States Patent Office 3,812,134
Patented May 21, 1974

3,812,134
4β-ALKOXY-4α-(3'-HYDROXYPHENYL)-3α,5α-PROPANOPIPERIDINE DERIVATIVES
Issei Iwai, Eiji Ohki, Sadao Oida, Hiromu Takagi, and Yoshihiko Ohashi, Tokyo, Japan, assignors to Sankyo Company Limited, Tokyo, Japan
No Drawing. Filed Nov. 8, 1972, Ser. No. 304,810
Claims priority, application Japan, Nov. 18, 1971, 46/92,574
Int. Cl. C07d *39/00*
U.S. Cl. 260—293.54           5 Claims

ABSTRACT OF THE DISCLOSURE

4β-alkoxy-4α-(3' - hydroxyphenyl) - 3α,5α - propanopiperidine derivatives having the formula

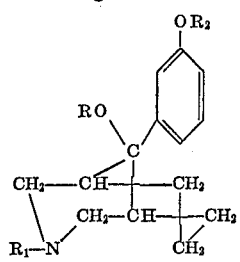

wherein R represents an alkyl group having 1–5 carbon atoms, $R_1$ represents an alkyl group having 1–5 carbon atoms or a phenylalkyl group having 1–5 carbon atoms in the alkyl moiety and $R_2$ represents hydrogen atom or an alkyl group having 1–5 carbon atoms. The piperidine derivatives are useful as analgesics and antitussives and prepared by reacting 4β (or α)-hydroxy-4α (or β)-(3'-hydroxyphenyl) - 3α,5α - propanopiperidine derivative having the formula

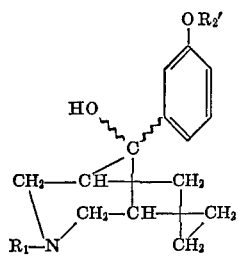

wherein $R_1$ is the same as above and $R_2'$ represents $R_2$ or an alkoxyalkyl group having 1–5 carbon atoms in each alkyl moiety with an alkanol having the formula

R—OH wherein R is the same as above in the presence of an acid.

---

This invention relates to novel 4β-alkoxy-4α-(3' - hydroxyphenyl)-3α,5α-propanopiperidine derivatives and a process for the preparation thereof.

In particular, this invention relates to 4β-alkoxy-4α-(3'-hydroxyphenyl)-3α,5α-propanopiperidine derivatives having the formula

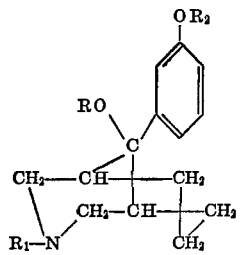
(I)

wherein R represents a straight or branched alkyl group having 1–5 carbon atoms such as methyl, ethyl, propyl, isopropyl, butyl, isobutyl and pentyl, $R_1$ represents a straight or branched alkyl group having 1–5 carbon atoms such as methyl, ethyl, propyl, isopropyl, butyl, isobutyl and pentyl or a phenylalkyl group having 1–5 carbon atoms in the alkyl moiety such as benzyl and phenylethyl and $R_2$ represents hydrogen atom or a straight or branched alkyl group having 1–5 carbon atoms such as methyl, ethyl, propyl, isopropyl and butyl and pharmaceutically acceptable acid addition salts thereof and also to a process for the preparation of the piperidine derivatives.

We have already reported in Chem. Pharm. Bull. (Japan) *8*, 2050–2057 (1970) about a process for the preparation of certain substituted 3α,5α - propanopiperidines and their analgesic activity.

Now, as a result of various investigations to 3α,5α-propanopiperidines, we have unexpectedly found that the novel 4β-alkoxy-4α-(3' - hydroxyphenyl) - 3α,5α - propanopiperidine derivatives having the formula (I) possess a prominent analgesic and antitussive activities to animals as compared with the known 3α,5α-propanopiperidines.

It is, accordingly, a principal object of this invention to provide novel 3α,5α-propanopiperidine derivatives of the above formula (I) and acid addition salts thereof which are useful as potent analgesics and antitussives.

Another object of this invention is to provide a process for the preparation of these valuable 3α,5α-propanopiperidine derivatives and acid addition salts thereof.

Other objects will be apparent in the following description.

One important embodiment of the present invention is the acid addition salts of the compounds of the above formula (I) which are derived from pharmaceutically acceptable non-toxic acids by conventional means. Such pharmaceutically acceptable non-toxic salts include those derived from both organic and inorganic acids such as hydrochloric, hydrobromic, sulfuric, phosphoric, methanesulfonic, acetic, lactic, succinic, malic, maleic, aconitic, phthalic, tartaric, embonic and like acids.

The compounds having the formula (I) have a prominent analgesic and antitussive activities. In particular, they are useful as an analgesic agent for pain after operation, chronic pain and pains caused by other diseases and generally administered orally or parenterally in an amount of from about 0.01 to 0.02 mg. as a single dose and from about 0.01 to 0.06 mg./day for adults.

Parenteral compositions including injectable solution and suspension are most preferable, but oral composition including tablets, capsules, powders and oral suspensions may be conveniently employed. These compositions may be easily prepared from the compounds (I) or acid addition salts thereof by a conventional technique known to those skilled in the art.

According to the process of this invention, the 4β-alkoxy-4α-(3'-hydroxyphenyl) - 3α,5α - propanopiperidine derivatives having the formula (I) can be prepared by reacting a 4β(or α)-hydroxy-4α (or β)-(3'-hydroxyphenyl)-3α,5α-propanopiperidine derivative having the formula

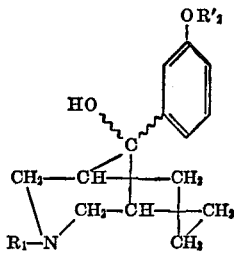
(II)

wherein $R_1$ is the same as above and $R_2'$ represents $R_2$ or an alkoxyalkyl group having 1–5 carbon atoms in each alkyl moiety with an alkanol having the formula $$ROH \qquad (III)$$

wherein R is the same as above in the presence of an acid.

When $R_2'$ is an alkoxyalkyl group, it is converted to hydrogen atom in the above reaction.

The process of this invention may be carried out as usual etherification of alcohols. Namely, the reaction may be readily carried out by contacting the compound (II) with the alkanol (III) in a suitable solvent in the presence of an acid. As the solvent, an excess amount of the alkanol employed as a reactant may be preferably used. When a solvent other than the alkanol is employed, there may be preferably employed aromatic hydrocarbons, for example, benzene or toluene. As the acid used in the reaction, there may be employed a mineral acid, for example, sulfuric acid and phosphoric acid and an organic acid, for example, p-toluene-sulfonic acid. The reaction temperatures are not critical, but the reaction is usually carried out at a reflux temperature of the solvent employed. The reaction period may be varied mainly depending upon the reaction temperature and a kind of the starting material and the alkanol. The reaction is usually completed within several hours. After completion of the reaction, the desired product may be recovered from the reaction mixture by a conventional means. For instance, the reaction mixture is diluted with water, neutralized and extracted with a suitable solvent. The extract is washed with water and dried. The solvent is distilled off to give the desired product. The product may be, if necessary, further purified by a conventional means, for example, recrystallization.

The starting materials having the formula (II) are novel and may be prepared by reacting a compound having the formula

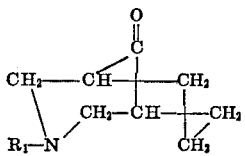

wherein $R_1$ is the same as above with a phenylmagnesium bromide having the formula

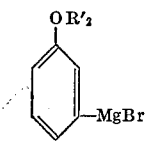

wherein $R_2'$ is the same as above. In the above reaction, there may be obtained the starting materials having the formula (II) as a mixture of stereoisomers and the mixture may be employed as starting materials in the present invention. But if necessary, it may be separated by means of chromatography. Analgesic and antitussive activities were tested about the compounds (I) and 4β-methoxy-4α-phenyl-1-methyl-3α,5α-propanopiperidine (E) having the most potent analgesic activity in the known 3α,5α-propanopiperidines. The analgesic activity test was carried out after 15, 30 and 60 minutes of the administration by Haffner tail pinch method [F. Haffner, Dtsch. Med. Wochschr. 55, 731 (1929)] using 5–10 male mice of approximately 20 g. of body weight per dose and the antitussive activity test was carried out by the Mechanically Stimulating Method [K. Takagi et al., Yakugaku Zasshi (Japan) 80, 1497 (1960)] using 5 guinea pigs of approximately 300 g. of body weight per dose. The analgesic and antitussive potencies were expressed as the $ED_{50}$ calculated by the Litchfield-Wilcoxon's method [J. T. Litchfield and F. Wilcoxon, J. Pharmacol. Exp. Therap. 96, 99 (1949)]. Acute toxicities were also determined using 5 male mice of approximately 20 g. of body weight per dose. The materials were administered subcutaneously and mortalities were recorded one week later. The $LD_{50}$ was also calculated by the Litchfield-Wilcoxon's method. These data were shown in the following table.

ANALGESIC AND ANTITUSSIVE ACTIVITIES AND ACUTE TOXICITY OF THE PRESENT COMPOUNDS (I)

| Compound:[1] | $ED_{50}$ (mg./kg.) analgesic activity | | | | | | $ED_{50}$ (mg./kg.) antitussive activity (s.c.) | $LD_{50}$ (mg./kg.) acute toxicity (s.c.) | Therapeutic index, $LD_{50}$/ analg. $ED_{50}$ (after 30 min.) |
|---|---|---|---|---|---|---|---|---|---|
| | Subcutaneous | | | Oral | | | | | |
| | 15 min. | 30 min. | 60 min. | 15 min. | 30 min. | 60 min. | | | |
| A | 0.01 | 0.016 | 0.03 | 0.034 | 0.078 | 0.15 | 0.011 | 88 | 5,500. |
| B | 0.15 | 0.12 | 0.36 | 0.105 | 0.07 | >0.5 | 0.34 | 39 | 325. |
| C | 0.0032 | 0.0032 | 0.0032 | 0.12 | 0.12 | 0.23 | 0.001 | >200 | More than 62,500. |
| D | 0.16 | 0.12 | 0.12 | 0.74 | 0.76 | 0.74 | 0.16 | >200 | More than 1,250. |
| E | 2.5 | 5.0 | >12 | | | | 8.1 | 200 | 40. |

[1] Compounds.—A: 4β-methoxy-4α(3'-hydroxyphenyl)-1-methyl-3α,5α-propanopiperidene; B: 4βmethoxy-4α(3'methoxyphenyl)-1-methyl-3α,5α-propanopiperidine; C: 4β-methoxy-4α(3'-hydroxyphenyl)-1-phenylethyl-3α,5α-prop anopiperidine; D: 4β-methoxy 4α(3'-methoxyphenyl)-1-phenylethyl-3α,5α-propanopiperidine; E: 4β-methoxy-4α-phenyl-1-methyl-3α,5α-propanopiperidine.

From the above experimental data, it will be apparent that the present compounds (I) exhibit very potent analgesic and antitussive activities and have relatively low toxicities. The following preparations and examples are given for the purpose of illustration of this invention.

PREPARATION 1

A mixture of 4α-hydroxy-4β-(3'-methoxymethoxyphenyl)-1-methyl-3α,5α-propanopiperidine and 4β-hydroxy-4α - (3' - methoxymethoxyphenyl) - 1 - methyl - 3α,5α-propanopiperidine (1) 5.1 g. of 50% sodium hydride mineral oil suspension is washed twice with n-hexane and suspended in 50 ml. of dimethoxymethane. To the suspension is added dropwise a solution of 17.5 g. of bromophenol in 50 ml. of dimethoxymethane with stirring and ice-cooling in nitrogen atmosphere. After the mixture is stirred for 30 minutes, 9.0 g. of chloromethyl methylether is added dropwise to the mixture and the mixture is stirred further for one hour. The reaction mixture is poured into ice-water and extracted three times with benzene. The extract is dried and the solvent is distilled off to give 20 g. of 3-bromo-1-methoxymethoxybenzene as a syrup which is purified by distillation. B.P. 125–130° C/7 mm. Hg.

I.R. $\nu_{max.}^{liq.}$ cm.$^{-1}$: 1599, 1578, 1478, 1155, 1000

N.M.R. (60 Mz. CDCl$_3$) δ p.p.m.:

6.80–7.30 (4H, multiplet)
5.05 (2H, singlet)
3.38 (3H, singlet)

Analysis.—Calculated for $C_8H_9O_2Br$: C, 44.27; H, 4.18; Br. 36.81. Found: C, 44.41; H, 4.18; Br. 36.73.

(2) 3-methoxymethoxyphenylmagnesium bromide is prepared from 1.2 g. of magnesium and 10 g. of 3-bromo-1-methoxymethoxybenzene in 50 ml. of ether by a usual manner. To the Grignard solution is added dropwise a solution of 5 g. of 1-methyl-3α,5α-propano-4-piperidone in 30 ml. of dry ether over a period of 30 minutes with stirring and cooling. After 30 minutes stirring, the mixture is decomposed by a careful addition of concentrated aqueous ammonia. The ether layer is collected and the aqueous layer is washed three times with ether. The combined ether layer and washings are dried and the solvent is distilled off to give 8.3 g. of a mixture of 4α-hydroxy - 4β - (3' - methoxymethoxyphenyl) - 1 - methyl-3α,5α-propanopiperidine and 4β - hydroxy - 4α - (3' - methoxymethoxyphenyl)-1-methyl-3α,5α - propanopiperidine as a syrup.

I.R. $\nu_{max.}^{liq.}$ cm.$^{-1}$: 3430, 1600, 1487, 1239, 1150, 1076 1026, 1003

N.M.R. (60 Mz., CDCl$_3$) δ p.p.m.:

6.80–7.32 (4H, multiplet)
5.15 (2H, singlet)
3.47 (3H, singlet)
2.22 (singlet)
1.83 (singlet)

PREPARATION 2

A mixture of 4β-hydroxy-4α-(3'-methoxyphenyl)-1-methyl-3α,5α-propanopiperidine and 4α - hydroxy - 4β - (3'-methoxyphenyl)-1-methyl-3α,5α-propanopiperidine To an ice-cold solution of 3-methoxyphenyl-magnesium bromide prepared from 6.3 g. of magnesium and 48.4 g. of 3-bromoanisol in 230 ml. of ether by a usual manner is added dropwise a solution of 31.6 g. of 1-methyl-3α,5α-propano-4-piperidone in 150 ml. of ether over a period of one hour with stirring. The mixture is stirred for one hour at room temperature and poured into ice-water. The ether layer is collected and the aqueous layer is extracted with ether four times. The combined ether layer and ether extract are extracted with a dilute sulfuric acid and the extract is made alkaline with aqueous sodium hydroxide and extracted with ether three times. The extracts are washed with water and dried. The solvent distilled off to give 52.25 g. of a mixture of 4β - hydroxy - 4α(3' - methoxyphenyl) - 1 - methyl - 3α, 5α-propanopiperidine and 4α - hydroxy - 4β(3' - methoxyphenyl) - 1 - methyl - 3α,5α - propanopiperidine as a syrup whose thin layer chromatography reveals 2 spots.

I.R. $\nu_{max.}^{liq.}$ cm.$^{-1}$: 3450, 1600, 1584, 1038, 708

PREPARATION 3

4α-hydroxy-4β(3'-hydroxyphenyl)-1-(β-phenylethyl)-3α,5α-propanopiperidine

A mixture of 2.0 g. of 4α-hydroxy-4β(3'-methoxyphenyl)-1-(β-phenylethyl)-3α,5α-propanopiperidine, 2.0 g. of sodium thioethoxide and 80 ml. of dimethylformamide is refluxed for 3 hours and then the solvent is distilled off in vacuo. The residue is dissolved in concentrated aqueous ammonium chloride and extracted with chloroform three times. The extracts are dried and the solvent is distilled off to give 2 g. of a crystalline mass. The product is recrystallized from n-hexane to give 440 mg. of the desired product as prisms melting at 98–101° C.

I.R. $\nu_{max.}^{Nujol}$ cm.$^{-1}$: 3400, 3350, 3230, 3100, 1597, 1500, 1380, 1280, 1100, 1030, 790, 742, 700.

N.M.R. (CDCl$_3$) δ p.p.m.:

1.0–3.0 (18H, multiplet)
6.5–7.2 (9H, multiplet)

Analysis.—Calculated for C$_{22}$H$_{27}$O$_2$N: C, 78.30; H, 8.07; N, 4.15. Found: C, 78.09; H, 7.97; N, 4.16.

PREPARATION 4

A mixture of 4α-hydroxy-4β(3'-methoxyphenyl)-1-(β-phenylethyl)-3α,5α-propanopiperidine and 4β-hydroxy-4α(3' - methoxyphenyl) - 1 - (β - phenylethyl) - 3α,5α-propanopiperidine (1) 1-(β-phenylethyl)-3α,5α-propano-4-piperidone: A mixture of 500 g. of β-phenylethylamine, 350 ml. of concentrated hydrochloric acid, 350 ml. of cyclohexanone, 820 ml. of 37% formalin and 5000 ml. of acetic acid is heated on a steam bath for one hour and 45 minutes and, after addition of 350 ml. of concentrated hydrochloric acid, the mixture is concentrated in vacuo. The residue is diluted with two times amount of water and washed with ether. The aqueous layer is made alkaline with sodium carbonate (anhydrous solid) and extracted with chloroform three times.

The solvent is distilled off from the extracts and the residue is dissolved with 1000 ml. of ethanol. To the ethanol solution is added gradually 300 ml. of acetic anhydride and the mixture is left to stand for 15 minutes. After addition of 350 ml. of concentrated hydrochloric acid, the mixture is concentrated in vacuo. The mixture is diluted again two times amount of water and washed with chloroform. The aqueous mixture is made alkaline with sodium carbonate (anhydrous solid) and extracted with chloroform three times. The combined extracts are dried and the solvent is distilled off. The residue is distilled to give 290 g. of a syrup, B.P. 160–180° C./1.5 mm. Hg which is crystallized on standing in a refrigerator.

Trituration with acetone in a Dry-Ice bath and collection of the crystals gives 110 g. of 1-(β-phenylethyl)-3α,5α-propano-4-piperidone, M.P. 40–43° C. The analytical sample is obtained by recrystallization from n-hexane, needles, M.P. 45–46° C.

I.R. $\nu_{max.}^{Nujol}$ cm.$^{-1}$: 1735, 1712, 1600, 1498, 1140, 743, 700

N.M.R. (CDCl$_3$) δ p.p.m.:

1.0–3.3 (16H, multiplet)
7.21 (5H, singlet)

Analysis.—Calculated for C$_{16}$H$_{21}$ON: C, 78.93; H, 8.70; N, 5.76. Found: C, 78.65; H, 8.62; N, 5.79.

(2) A mixture of 4α-hydroxy-4β(3'-methoxyphenyl)-1 - (β - phenylethyl) - 3α,5α - propanopiperidine and 4β-hydroxy - 4α(3' - methoxyphenyl) - 1 - (β - phenylethyl)-3α,5α-propanopiperidine: To a Grignard reagent prepared from 2.0 g. of magnesium and 27 g. of 3-bromoanisol in 20 ml. of tetrahydrofuran is added dropwise a solution of 10 g. of 1-(β-phenylethyl)-3α,5α-propano-4-piperidone in 10 ml. of tetrahydrofuran while keeping at 5° C. with ice-cooling and stirring in nitrogen atmosphere. The mixture is further stirred at room temperature for 20 minutes. The mixture is diluted with saturated aqueous ammonium chloride and extracted with chloroform three times. The combined extracts are dried and evaporated to give 8.5 g. of a syrup whose thin layer chromatography indicates the prominent formation of 4α-hydroxy-4β(3'-methoxyphenyl) - 1 - (β-phenylethyl)-3α,5α-propanopiperidine contaminated with a small amount of the stereoisomer.

I.R. $\nu_{max.}^{liq.}$ cm.$^{-1}$: 3450, 1600, 1580, 1481, 1450, 1288, 1250, 1100, 1010, 780, 765, 740, 700.

N.M.R. (CDCl$_3$) δ p.p.m.:

1.0–3.2 (17H, multiplet)
3.77 (3H, singlet)
6.7–7.5 (9H, multiplet)

Analysis.—Calculated for C$_{23}$H$_{29}$O$_2$N: C, 78.59; H, 8.32; N, 3.99. Found: C, 78.30; H, 8.36; N, 4.14.

20 g. of the 4α-hydroxy compound thus obtained is dissolved in 20 ml. of dilute 10% hydrochloric acid and the solution is refluxed for 5 hours. The cooled mixture is made alkaline with sodium carbonate (anhydrous solid) and extracted with chloroform three times. The extracts are dried and evaporated to give a syrup which is crystallized on standing in a refrigerator. Recrystallization from n-hexane gives 1.3 g. of the 4β-hydroxy isomer as prisms melting at 83–4° C.

I.R. $\nu_{max}^{Nujol}$: 3540, 3400, 1599, 1485, 1380, 1202, 780, 740, 700

N.M.R. (CDCl$_3$) δ p.p.m.:
1.0–3.2 (17H, multiplet)
3.79 (3H, singlet)
6.70–7.5 (9H, multiplet)

Analysis.—Calculated for $C_{23}H_{29}O_2N$: C, 78.59; H, 8.32; N, 3.99. Found: C, 78.68; H, 8.48; N, 4.37.

EXAMPLE 1

4β-methoxy-4α(3'-hydroxyphenyl)-1-methyl-3α,5α-propanopiperidine (1) In 300 ml. of absolute methanol is dissolved 10.0 g. of 4β-hydroxy-4α(3'-methoxymethoxyphenyl)-1-methyl-3α,5α-propanopiperidine and to the solution is added dropwise 30 ml. of concentrated sulfuric acid under cooling.

The solution is refluxed for 4 hours. After cooling, the reaction mixture is diluted with an equivalent amount of ice-water, made alkaline by addition of sodium carbonate and extracted with benzene. The extract is washed with water and dried over anhydrous sodium sulfate. The solvent is distilled off to give 6.9 g. of oils.

The oils are crystallized from a mixture of benzene and n-hexane to give 3.0 g. of the desired product melting at 158–160° C.

I. R. (Nujol)* $\nu_{max}$.cm.$^{-1}$: 3280, 1601, 1500, 1460, 1445, 1280, 1217, 1058

N.M.R. (60 Mz. CDCl$_3$) δ p.p.m.:
6.65–7.40 (4H, multiplet)
5.28 (1H, singlet)
2.83 (3H, singlet)
2.23 (3H, singlet)

Analysis.—Calculated for $C_{16}H_{23}O_2N$: C, 73.58; H, 8.77; N, 5.20. Found: C, 73.53; H, 8.87; N, 5.36.

When, in the above procedure, the 4β-methoxy-4α(3'-methoxymethoxyphenyl) piperidine compound is replaced by 4α-methoxy-4β(3'-methoxymethoxyphenyl)-1-methyl-3α,5α-propanopiperidine or a mixture of 4β-methoxy-4α-(3'-methoxymethoxyphenyl)-1-methyl - 3α,5α - propanopiperidine and 4α-methoxy-4β-(3'-methoxymethoxyphenyl)-1-methyl-3α,5α-propanopiperidine, there is obtained the same product as in the above procedure.

(2) When, in the procedure of Example 1–(1), the 4β-hydroxy-4α(3' - methoxymethoxyphenyl)-1-methyl-3α,5α-propanopiperidine is replaced by 4β-hydroxy-4α(3'-hydroxyphenyl)-1-methyl-3α,5α-propanopiperidine, there is obtained the same product as in Example 1–(1) with 40% yield.

EXAMPLE 2

4β-methoxy-4α(3'-methoxyphenyl)-1-methyl-3α,5α-propanopiperidine

A mixture comprising 1.022 g. of a mixture of 4α-hydroxy - 4β(3'-methoxyphenyl-1-methyl-3α,5α-propanopiperidine and a stereoisomer thereof, i.e., 4β-hydroxy-4α - (3' - methoxyphenyl)-1-methyl-3α,5α-propanopiperidine, 40 ml. of absolute methanol and 4 ml. of concentrated sulfuric acid is refluxed for 8 hours. The reaction mixture is made alkaline by addition with aqueous ammonia and concentrated. The concentrate is diluted with water and extracted with chloroform. The extract is washed with water and dried over anhydrous sodium sulfate. The solvent is distilled off to give 1.116 g. of crystals. The crystals are recrystallized from n-hexane to give 0.43 g. of the desired product as needles melting at 82–83° C. The mother liquor of the recrystallization is concentrated and the concentrate is subjected to column chromatography using 40 g. of alumina. The eluates with a mixture of n-hexane-chloroform (8:1 v./v.) are collected and the solvent is distilled off to give 0.22 g. of the desired product.

I.R. (Nujol mull) $\nu_{max}$.cm.$^{-1}$: 1602, 1579, 1070, 792

N.M.R. (CDCl$_3$) δ p.p.m.:
2.23 (3H, singlet)
2.82 (3H, singlet)
3.85 (3H, singlet)
6.75–7.55 (4H, multiplet)

Analysis.—Calculated for $C_{17}H_{25}O_2N$: C, 74.14; H, 9.15; N, 5.09. Found: C, 74.73; H, 9.23; N, 5.21.

The desired product may be also obtained by using each separated stereoisomer instead of a mixture of the stereoisomers.

EXAMPLE 3

4β-methoxy-4α(3'-hydroxyphenyl)-1-(β-phenylethyl)-3α,5α-propanopiperidine

A mixture of 1.2 g. of 4α-hydroxy-4β(3'-hydroxyphenyl)-1-(β-phenylethyl)-3α,5α-propanopiperidine, 40 ml. of absolute methanol and 4 ml. of concentrated sulfuric acid is refluxed for 8 hours.

The reaction mixture is poured into ice-water and the mixture is made alkaline with sodium carbonate (anhydrous solid) and extracted with chloroform. The extract is dried and the solvent is distilled off to give 780 mg. of a syrup, which is crystallized on standing. The crystals are collected and recrystallized from n-hexane to give the desired product melting at 119° C.

EXAMPLE 4

4β-methoxy-4α(3'-methoxyphenyl)-1-(β-phenethyl)-3α,5α-propanopiperidine

A mixture of 600 mg. of 4-hydroxy-4β-(3'-methoxyphenyl) - 1-(β-phenylethyl)-3α,5α-propanopiperidine, 20 ml. of methanol and 2 ml. of concentrated sulfuric acid is refluxed for 8 hours. The reaction mixture is poured into ice-water and the mixture is made alkaline by addition of anhydrous sodium carbonate and extracted with chloroform. The extract is dried over anhydrous sodium sulfate and the solvent is distilled off to give 400 mg. of the desired product as oil.

I.R. (liquid film) $\nu_{max}$.cm.$^{-1}$: 1600, 1580, 1488, 1260, 1078, 1058, 700

N.M.R. (CDCl$_3$) δ p.p.m.:
1.0–3.2 (16H, multiplet)
2.80 (3H, singlet)
3.80 (3H, singlet)
6.6–7.4 (9H, multiplet)

Analysis.—Calculated for $C_{24}H_{31}O_2N \cdot H_2O$: C, 75.16; H, 8.67; N, 3.65. Found: C, 74.74; H, 8.54; N, 3.54.

When, in the above procedure, the 4α-hydroxy-4β(3'-methoxyphenyl)piperidine compound is replaced by the stereoisomer, i.e., 4β - hydroxy-4α(3'-methoxyphenyl)-1-(β-phenylethyl)-3α,5α-propanopiperidine or a mixture of both stereoisomers, there is obtained the same product as in the above procedure.

What is claimed is:

1. A 4β - alkoxy-4α(3'-hydroxyphenyl)-3α,5α-propanopiperidine derivative having the formula

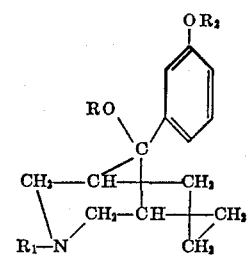

wherein R represents a straight or branched alkyl group having 1–5 carbon atoms, R$_1$ represents a straight or ---
*Nujol is a registered trademark for a liquid paraffin.

branched alkyl group having 1–5 carbon atoms or a phenylalkyl group having 1–5 carbon atoms in the alkyl moiety and $R_3$ represents hydrogen atom or a straight or branched alkyl group having 1–5 carbon atoms and pharmaceutically acceptable acid addition salts thereof.

2. $4\beta$ - methoxy-$4\alpha$(3'-hydroxyphenyl)-1-methyl-$3\alpha,5\alpha$-propanopiperidine.

3. $4\beta$ - methoxy-$4\alpha$(3'-methoxyphenyl)-1-methyl-$3\alpha,5\alpha$-propanopiperidine.

4. $4\beta$ - methoxy - $4\alpha$(3'-hydroxyphenyl)-1-($\beta$-phenylethyl)-$3\alpha,5\alpha$-propanopiperidine.

5. $4\beta$ - methoxy - $4\alpha$(3'-methoxyphenyl)-1-($\beta$-phenylethyl)-$3\alpha,5\alpha$-propanopiperidine.

References Cited

UNITED STATES PATENTS

| | | | |
|---|---|---|---|
| 3,167,562 | 1/1965 | Iwai et al. | 260—294.3 |
| 3,475,439 | 10/1969 | Iwai et al. | 260—294 |

OTHER REFERENCES

Ohki et al., Chem. Pharm. Bull. 1970, 18(10), 2050–7; Chem. Abstracts 74: 21736n (1971).

G. THOMAS TODD, Primary Examiner

U.S. Cl. X.R.

424—267